United States Patent [19]

Kershaw et al.

[11] 3,839,253

[45] Oct. 1, 1974

[54] MATTE AQUEOUS COATING COMPOSITIONS CONTAINING PIGMENTED SYNTHETIC POLYMER

[75] Inventors: Robert William Kershaw, South Blackburn, Victoria; Frederick John Lubbock, Beaumaris, Victoria, both of Australia

[73] Assignee: Balm Paints Limited, Melbourne, Victoria, Australia

[22] Filed: Mar. 8, 1972

[21] Appl. No.: 232,914

Related U.S. Application Data

[63] Continuation of Ser. No. 816,398, April 15, 1969, abandoned.

[30] Foreign Application Priority Data

Apr. 22, 1968  Australia............................ 36726/68
July 8, 1968  Australia............................ 40352/68

[52] U.S. Cl...260/29.6 R, 117/161 UA, 260/29.2 EP, 260/29.3, 260/29.4 R, 260/29.6 XA, 260/29.6 RB, 260/29.6 NR, 260/29.6 MM, 260/29.6 ME, 260/29.7 R
[51] Int. Cl. ............................................ C08f 45/24
[58] Field of Search..260/29.6 R, 29.6 RU, 29.6 NR, 260/29.6 OL, 29.2 N, 29.6 MM, 29.7 R

[56] References Cited
UNITED STATES PATENTS

| 2,567,678 | 9/1951 | Morrison........................ 260/29.6 R |
| 2,601,315 | 6/1952 | Morrison et al. .............. 260/29.6 R |
| 2,720,496 | 10/1955 | Bushnell......................... 260/29.6 R |
| 2,739,910 | 3/1956 | McGarvey...................... 260/29.6 R |
| 2,837,444 | 6/1958 | Hahn.............................. 260/29.6 R |
| 2,909,449 | 10/1959 | Banigan ......................... 260/29.6 R |
| 3,014,004 | 12/1961 | Meier.............................. 260/29.6 R |
| 3,287,290 | 11/1966 | Bray............................... 260/29.6 R |
| 3,674,736 | 7/1972 | Lerman et al.................. 260/29.6 R |

*Primary Examiner*—Harold D. Anderson
*Attorney, Agent, or Firm*—Cushman, Darby & Cushman

[57] ABSTRACT

Coating compositions which dry to a matte film (80° gloss 10 maximum) and comprising an aqueous latex in which is dispersed 45–90 percent by volume based on the solids content of granules of polymer containing 1–75 percent by weight of pigment. The granules have a Stokes diameter of 1–50 micron, a specific weight average mean Stokes diameter related to their volume concentration in the total solids of the coating and an elongation at break of 40 percent maximum.

7 Claims, No Drawings

MATTE AQUEOUS COATING COMPOSITIONS CONTAINING PIGMENTED SYNTHETIC POLYMER

This is a continuation, of application Ser. No. 816,398, filed Apr. 15, 1969 now abandoned.

This invention relates to aqueous latex coating compositions and in particular to such compositions containing granular polymeric matting agents.

It is known that the surface appearance of a dried film formed on a substrate from a pigmented liquid coating composition is dependent on a number of factors including the pigment volume concentration of the film and the nature and size of the pigment particles embedded therein. In general, high pigment volume concentrations and the presence of large pigment particles which disrupt or protrude through the dry film surface both favour the development of low gloss surfaces. Suitably sized inorganic pigments of both ultrafine and relatively coarse mean diameters have been added to coating compositions to utilise one or other of these effects in preparing matte finishes. These approaches have produced useful finishes but they have introduced or accentuated certain other problems, for example those defects commonly referred to as sheeriness, rub-up, excessive dirt retention and low mar resistance, the overall composition becoming a compromise between an acceptable degree of flatting and the attendant disadvantages of pursuing flatter films.

Some proposals have been made to utilise granular polymeric particles in coating compositions, usually non-aqueous coating, to produce textured effects and films formed therefrom may have a relatively low-gloss, especially when assessed by, for example, a photoelectric gloss meter. However, to the eye the effect is typically that of a low-gloss, irregularly contoured film in which isolated non-coplanar surfaces of higher reflectance are visible, rather than a flat film of uniform low reflectance.

We have now found that provided they are selected in the manner hereinunder described, certain pigmented polymer granules may be utilised to produce aqueous coating compositions which do dry to matte films of uniform visual appearance and good mar resistance. By matte films we mean films which, when tested by the method of the American Society for Testing and Materials method D-523-62T using an 85° gloss head and a Gardner Photo-Electric automatic Gloss Meter, have a gloss of 10 units or less.

According to the present invention we provide a coating composition which when dried as a film on a substrate has an 85° gloss reading of 10 maximum the said composition comprising from 45-90 percent by volume based on the total solids content of the coating of granules of pigmented polymer dispersed in an aqueous latex of film-forming polymer and further characterised in that the said granules:

a. comprise from 1–75 percent by weight of pigment particles and are essentially of from 1–50 micron Stokes diameter with a weight average mean Stokes diameter related to their volume concentration in the total solids of the coating according to the following table:

| Volume Concentration of Granules | Weight Average Mean Stokes Diameter in Micron | | |
|---|---|---|---|
| | Limit | Preferred | Most Preferred |
| 45 – 50% | 5 – 35 | 5 – 30 | 10 – 25 |
| over 50 – 60% | 5 – 35 | 5 – 28 | 10 – 23 |
| do. 60 – 70% | 5 – 30 | 5 – 25 | 10 – 20 |
| do. 70 – 80% | 5 – 30 | 5 – 22 | 10 – 20 |
| do. 80 – 90% | 5 – 28 | 5 – 20 | 10 – 20 | b. have an elongation at break of 40 percent maximum.

The granules should be inert towards and insoluble in the film-forming polymer and should not flow or decompose at the temperature at which the coating film is to be formed. Furthermore, it is a practical requirement of most matte coating films that when cleaned, for example by rubbing gently with a dry cloth or more vigorously with a water-wet cloth, the appearance, especially the gloss level, should not be marred appreciably. In general we have found that these requirements are met by choosing pigmented granules which do not react chemically with and are insoluble in the film-forming polymer and which have an elongation at break (American Society for Testing and Materials method D-412-61T) of 40 percent maximum. That is they are relatively rigid, as distinct from pliable, rubbery bodies.

The elongation at break is performed on a film or rod having the composition of the pigmented polymer granules.

When the coating composition is applied to a substrate by, for example, brush, roller or by spraying and allowed to dry in air, optionally with the application of heat to shorten the drying time, the disperse film-forming polymer of the latex coalesces to form a coherent film in which the polymer granules are embedded, thereby providing a matte coating on the substrate.

The disperse polymer of the aqueous latex may be a natural or synthetic polymer or blends of polymer and the composition is not critical. We have found that our invention is applicable to all of the polymers or copolymers commonly used as film-formers in latex paints. Such polymers are for example homopolymers or copolymers of the following classes of monomers:

vinyl esters and ethers, alkyl acrylates and methacrylates, alkyl fumarates and maleates, halogenated vinyls, aryl vinyls and olefins.

For example suitable monomers are vinyl acetate, vinyl propionate, vinyl caproate, vinyl stearate, vinyl esters of saturated tertiary monocarboxylic acids, vinyl siloxanes and the saturated monohydric alcohol esters of unsaturated acids, e.g., acrylic acid, methacrylic acid, maleic acid and fumaric acid, including those esters derived from methanol, ethanol, n-propanol, iso-propanol, n-butanol, iso-butanol, cyclohexanol, 2-ethyl hexanol, dodecanol, hexadecanol and octanol. Other suitable monomers include vinyl chloride, vinylidene chloride, vinylidene fluoride, styrene, α-methyl styrene, the commercial mixed isomers known as vinyl toluene and acrylonitrile. The copolymers may contain a proportion, usually a minor proportion, e.g., 1–5 percent by weight, of the above unsaturated acids themselves.

Alternatively, the resinous particles may comprise essentially linear polymers or copolymers of ethylene, propylene, isoprene, chloroprene and butadiene. The particle size of the film-forming polymer will usually be within the range of from 0.02–5.0 micron.

The shape of the polymer granules must be considered when preparing matte coating films of uniform appearance. Certain particles such as plate-like and elongated angular particles tend to become oriented in a film applied, for example, by brush or roller and may give rise to local imperfections in the dried film. The granules should, therefore, be substantially of a nodular or chunky nature and not of a laminar or acicular structure. We have found that the best results are given by using spheroidal granules, which are our preferred granules.

The Stokes diameter of the granules is conveniently determined by a liquid sedimentation method, e.g., using an Andreason pipette. A suitable method is described in British Standard 3406: Part 2. A Stokes diameter/weight fraction curve for the granules is plotted from these measurements and the weight average mean Stokes diameter derived arithmetically therefrom. While we require that the granules be essentially of from 1–50 micron Stokes diameter, it will be understood that it is not practical nor is if necessary to fractionate particles to the exclusion of all particles other than those of the specified diameters. We do not exclude from use according to this invention mixtures of granules in which a trace, e.g., less than 10 percent by weight of the granules lies outside of the above limits.

In addition to so-limiting the overall Stokes diameter of the granules we impose a further restriction relating to their size distribution, for the successful performance of the invention. If, for example, the granules are all of a relatively uniform Stokes diameter approaching 1 micron, the films formed from coatings containing such particles tend to have poor mar resistance, e.g., rubbing the film to erase dirt may produce a marked increase in gloss. On the other hand, coating compositions comprising granules predominantly within the range of say 40–50 micron can lead to coating films of non-uniform appearance, especially noticeable when applied to large surfaces, e.g., passage walls and ceilings.

Bearing in mind that the acceptable limits of appearance and resistance to rub-up of coatings is in part related to their end use, for some applications, e.g., matte paints for ceilings, satisfactory compositions can be prepared from granules of which the weight average mean diameter lies anywhere within our broadest above-specified range. However, the most generally useful granules are those in which the weight average mean diameter of the granules is related to their volume concentration in the total solids of the coating according to our above-defined preferred limits.

When the coating films are to be subjected to rigorous conditions during application, for example when they are to be applied to a substrate by brush with overlapping coats, and/or when an unusually high resistance to marring is required, we prefer to further restrict the selection of granules to lie within our above-defined most preferred range of weight average mean Stokes diameters.

The polymeric composition of the granules is not critical provided the above requirements of inertness and rigidity are met. For example the granules may comprise condensation polymers, e.g., polyester, phenolic, phenol-formaldehyde, urea-formaldehyde and epoxy resins.

Especially suitable polymeric compositions for the spheroidal granules are addition polymers and in particular addition polymers of $\alpha,\beta$-ethylenically unsaturated monomers. Thus the polymers may be homopolymers or copolymers of unsaturated monomers described above with reference to the film-forming disperse polymer. The granules may, but need not, comprise polymer of the same chemical type as that of the disperse film-forming polymer. Because of the ease with which they can be made, we prefer to use granules comprising polymer derived from:

aromatic substituted ethylenes, e.g., styrene, $\alpha$-methyl styrene and vinyl toluenes; vinyl acetate; and lower saturated alcohol esters of acrylic and methacrylic acid, e.g., their methyl, ethyl and $n$-butyl esters.

A convenient way of increasing the toughness and hardness of the polymer is to introduce therein a controlled degree of cross-linking. For example a cross-linked copolymer may be formed by the addition copolymerisation of methyl methacrylate monomer containing a minor proportion, e.g., 1–5 percent by weight, of divinyl benzene.

The pigment to be used in the granules may be, for example:

a prime pigment, that is an opaque pigment with a refractive index of greater than 1.9, e.g., titanium dioxide, zinc oxide and antimony oxide;

a coloured inorganic pigment, e.g., oxides and hydroated oxides of iron, prussian blue and lead chromes; an organic pigment, e.g., C.I. Pigment Red 3, 4, 6 and 48, C.I. Pigment Yellow 1 and 3, C.I. Pigment Violet 19, C.I. Vat Yellow 1 and carbon black; and a low refractive index 'extender' pigment, e.g., calcium carbonate, silica, barium sulphate, alumina and naturally occurring aluminium silicates, e.g., kaolinite, dickite and montmorillonite.

The C.I. pigment numbers refer to the classified groups of pigments as set out in the "Society of Dyers and Colorists, Colour Index," Second Edition and Supplement, 1963.

A single pigment or a mixture of two or more such pigments may be present in the granules.

Although the granules may comprise from 1–75 percent by weight of pigment particles it is known in the art that the weight of pigment which can be incorporated into a given polymer depends on factors such as the density and specific surface area of that pigment. For example while 75 percent of r-titania can be satisfactorily incorporated into a granule of poly(styrene) the corresponding practical limitation for carbon black may well be of the order of 5–7 percent. That is at extreme concentrations of carbon black, a coherent mass of pigmented polymer will not form, while at somewhat lower concentrations the pigmented granules are so friable that they disintegrate during incorporation into the aqueous latex; that is the pigment particles are then commonly referred to as being under-bound.

It is to be understood that the known criteria by which under-bound pigmented polymer mixtures are recognised and overcome by reducing the proportion of pigment in the mixture are to be applied in preparing pigmented polymer granules which have sufficient mechanical strength to remain intact when incorporated into the latex.

The presence of pigment in the granule can contribute to the colour and/or opacity of the coating. Alternatively, when the pigment is a low refractive index 'extender' pigment it may primarily be responsible for increasing the hardness of the polymeric granule, although somewhat surprisingly we have found that granules so-pigmented can contribute some opacity to the coating film in which they are embedded.

In a preferred embodiment of our invention the compositions provide high-opacity coatings and in this embodiment in particular we prefer that the polymer granules comprise at least 45 percent by weight of prime pigment, the preferred prime pigment being titanium dioxide.

The pigment must be insoluble in the polymer of the granule and when it is to be present during the reaction by which the polymer is formed, it must be inert with respect to the reaction and insoluble in the reactants.

The particle-size of the pigment is related to the particle-size of the granules. For example if the granules comprise some particles with a diameter approaching 1 micron it is obviously not possible to prepare these from pigment particles with a diameter of say 5 micron or greater. Bearing in mind this inherent limitation, we limit our choice to those pigments which have a maximum diameter of 2 micron and for the best results we have found that the pigment should have a maximum diameter which is essentially less than 1 micron.

The granules may be prepared by milling preformed bulk pigmented polymer to the required particle-size distribution. While this method of manufacture can yield satisfactory granules, it tends to produce a preponderance of very fine and/or non-spheroidal granules which require further after-treatment to give an acceptable product.

An alternative preferred method is to disperse the pigment in a suitable polymerisable monomer which is then emulsified in water and polymerised to form insoluble granules of the required composition. By the careful control of reaction conditions granules of the required particle-size distribution can be made directly and are then either separated mechanically from the water or incorporated directly into the aqueous latex as a slurry.

For example titanium dioxide dispersed in methyl methacrylate monomer can be emulsified in water in the presence of an emulsion stabiliser, the monomer then being polymerised by heat and the addition of a free radial initiator to produce water-insoluble spheroidal granules of poly(methyl methacrylate) pigmented with titanium dioxide.

However, the performance of this invention is not limited to the use of polymeric granules so-prepared.

The volume concentration of polymeric granules compositions used in the composition (G.V. Conc.) is related in part to the end use of the coatings. At concentrations of granules lower than 45 percent, coating films are formed which are prone to sheeriness. On the other hand, if the concentration of granules exceeds that given in the above table, films formed from the coating will, for example, have poor mechanical properties and/or the optical defect referred to as 'flip' predominates. That is, the visual brightness of the dried film is critically dependent on the viewing angle. For example a film may appear to be a clean-toned white when viewed at one angle to the plane of the film, but alters its appearance to a dull grey as the angle of viewing is progressively changed. The change-over usually takes place abruptly over a few degrees of alteration of viewing angle and in the case of coloured films, may be accompanied by a marked change in chroma as well as in brightness. To some extent, the resistance to sheeriness and 'flip' of the film depends on the method of application, so when maximum resistance to sheeriness is required, high concentrations of granules are preferred, the lower concentrations favouring maximum resistance to 'flip.'

The most preferred volume concentration of granules is 55–75 percent of the total solids content of the coating.

It is a surprising feature of our invention that the compsoitions we describe form well-integrated films of good cohesion and uniform appearance at such high granule volume concentrations as 80–90 percent. For example, in typical conventional low-gloss aqueous latex paints, the volume concentration of non-film-forming solids is limited to 65–75 percent.

The aqueous latex must provide sufficient film-forming polymer to bind the solid components of the composition into a coherent film in the absence of the volatile components.

The aqueous latex itself may be pigmented, for example in the conventional manner of a latex paint. In the preferred embodiment of our invention in which the compositions provide high-opacity coatings, the latex solids (excluding the polymeric granules added thereto) comprises at least 45 percent by weight of prime pigment, the preferred pigment being titanium dioxide. An indication of the amount of film-forming polymer required is given by the Critical Pigment Volume Concentration of the latex. This parameter is a known physical transition point in pigment-binder systems and is defined, for example, in "Industrial and Engineering Chemistry," 41, 17, 1470 (1949). In general, provided the pigment volume concentration of the composition, excluding the polymeric granules, is below the Critical Pigment Volume Concentration, adequately bound coatings of high mar resistance will be formed according to the invention, up to the maximum stipulated volume concentration of granules. For the purpose of this determination, any particulate solid material insoluble in the film-forming polymer of the latex is considered to be pigment. We do not exclude, however, the use of a latex which is above its Critical Pigment Volume Concentration, as for some applications, e.g., where mar resistance is of less importance than a flat, high-opacity film, the use of a latex above this concentration may be acceptable.

In general, when the aqueous latex is pigmented we prefer to use granules in which the pigment is white or of the same composition as that of the latex. However, novel optical effects can be obtained by the use of granules which contain a low level of pigment or pigment of a contrasting colour to that of the pigmented latex.

In the preferred embodiment of our invention in which the compositions provide high-opacity coatings, the composition of the coating excluding the polymeric granules, comprises at least 45 percent by weight of prime pigment, the preferred pigment being titanium dioxide.

The compositions are prepared by stirring the granules into the aqueous latex, which is optionally pigmented and may comprise other auxiliary materials, for example coalescing agents, plasticiser, thickening agents and preservatives. The total solids of the composition are typically 30–70 percent by weight.

The invention is illustrated by the following examples in which all parts are given by weight:

Example 1

Preparation of a range of coating compositions comprising pigmented sphexoidal granules and developed sequentially with respect to the volume concentration of the granules (G.V. Conc.) based on the total solids of the compositions. Compositions 2–6 are according to the invention, while compositions 1 and 7 lie outside of the defined limits.

The overall compositions of the coatings is given in table 1 and certain ingredients are identified as follows:

| | |
|---|---|
| Titanium dioxide | a pigment-grade rutile-titania with an inorganic coating. |
| Silica | mean Stokes diameter 1–8 micron, specific surface area approximately 350 sq. m. per gm. |
| Aqueous latex | fine particle-size commercial acrylic copolymer aqueous latex, 46.5% total solids by weight. Plasticised by the addition of 5% by weight based on the latex solids of tri-n-butyl phosphate. |
| Spheroidal granules | poly(methyl methacrylate) granules containing 60% by weight of titanium dioxide; used as a 60% by weight aqueous slurry. Approximate weight average mean Stokes diameter 15 micron and elongation at break less than 10%. |

The weight average mean Stokes diameter of the granules was determined in the following manner. Using an Andrearson pipette, the weight percentages of granules having a Stokes diameter of less than certain chosen dimensions in micron (D) were determined by the method of British Standard B.S. 3406 : Part 2 : 1963, with the following results:

| Weight % Less Than D | D, Micron |
|---|---|
| 100 | 94 |
| 100 | 64 |
| 91 | 20 |
| 41 | 11 |
| 14 | 6 |

A curve was derived graphically from the above results, plotting D against the corresponding cumulative weight percent of granules with a Stokes diameter of less than D. From the curve, the weight percentage of granules in each of a contiguous series of particle size ranges (e.g., 0–5 micron, 5–10 micron, 10–15 micron etc.) was estimated ($W_1$) and identified with the midpoint dimension in micron of the corresponding particle range ($D_1$), e.g.,

| Range | | $W_i$ | $D_i$ |
|---|---|---|---|
| 0–5 | micron | 10 | 2.5 |
| 5–10 | do. | 25 | 7.5 |
| 10–15 | do. | 32 | 12.5 |

The weight average mean Stokes diameter (W.M.D.) was then calculated from the formula:

$$\text{W.M.D.} = \Sigma W_i . D_i / 100$$

In preparing each of the coating compositions, titanium dioxide and sodium hexametaphosphate were added to the aqueous slurry of spheroidal granules and the mixture stirred with a high-speed mechanical disk agitator for 30 minutes. The silica and 1, 2-propylene glycol were then added and stirring continued for a further 10 minutes. The stirring speed was then reduced to reduce aeration and the plasticised latex added.

In each case, homogeneous white coating compositions were formed. A comparative evaluation of the coatings is described in example 2.

Table 1

| | Composition (as parts by weight) | | | | | | |
|---|---|---|---|---|---|---|---|
| | No.1 | No.2 | No.3 | No.4 | No.5 | No.6 | No.7 |
| Spheroidal granules (slurry) | 40.0 | 46.0 | 58.4 | 66.4 | 71.7 | 89.2 | 94.0 |
| Titanium dioxide | 21.6 | 19.5 | 15.0 | 12.1 | 10.2 | 3.9 | 2.2 |
| Sodium Hexametaphosphate | 0.1 | 0.1 | 0.1 | 0.06 | 0.05 | 0.02 | 0.01 |
| Silica | 1.5 | 1.4 | 1.0 | 0.84 | 0.75 | 0.28 | 0.19 |
| 1, 2-propylene glycol | 6.1 | 5.5 | 4.2 | 3.4 | 2.9 | 1.1 | 0.6 |
| Aqueous latex | 30.7 | 27.5 | 21.3 | 17.2 | 14.4 | 5.5 | 3.0 |
| Approximate G.V. Conc. | 40 | 46 | 58 | 66 | 72 | 89 | 94 |

Example 2

Comparative evaluation of the properties of films formed from the compositions of example 1 and of a typical commercial 'flat' white aqueous latex paint.

The commercial 'flat' white aqueous latex paint comprised a vinyl acetate copolymer aqueous latex, titanium dioxide and 'extender' pigments at a pigment volume concentration based on the composition of the dry film of approximately 50 percent.

Films of each composition were applied by brush to glass panels at a spreading rate of approximately 600 sq. ft. per gallon and allowed to dry in air at 25°C and 50 percent relative humidity. All compositions formed coherent, dry films in less than one hour.

The dried films were tested after ageing for 48 hours at ambient room temperature in the following manner:

| | |
|---|---|
| 85° gloss | A.S.T.M. D-523-62T. |
| Sheeriness | Rated visually. |
| Gloss increase — dry polishing | The films were rubbed gently by hand with a dry cloth and the gloss increase rated visually. |
| Gloss increase — wet polishing and film integrity | The films were rubbed vigorously with a water-wet cloth and assessed visually for gloss increase. Film integrity was assessed visually on the basis of the resistance to removal of the paint film during this test. |

The results of the above tests are shown in table 2.

Table 2

The compositions numbered 1–7 refer to the corresponding compositions described in example 1. Composition No. 8 is the commercial 'flat' white aqueous latex paint.

compositions Nos. 3, 4 and 5, which lie within our preferred composition range. All of the compositions Nos. 1–7 had a much lower 85° gloss level than the typical commercial 'flat' paint.

Example 3

Preparation of a coating composition comprising pigmented spheroidal granules with more than 10 percent by weight of the granules having a particle-size of greater than 50 micron.

The ingredients in the coating were the same as in example 1 except for the spheroidal granules, which had the following characteristics:

poly(methyl methacrylate) granules containing 10 percent by weight of titanium dioxide, used as a 45 percent by weight aqueous slurry. Elongation at break less than 10 percent. Stokes diameter (D) determined using an Andreason pipette,

| Weight % Less Than D | D, Micron |
|---|---|
| 96 | 70 |
| 81 | 48 |
| 64 | 39 |
| 37 | 21 |
| 13 | 11 |

Approximate weight average mean Stokes diameter, 35 micron.

The overall composition of the coating composition was as follows:

| | | |
|---|---|---|
| Spheroidal granules (slurry) | 40.2 | parts |
| Titanium dioxide | 21.8 | do. |
| Sodium Hexametaphosphate | 0.1 | do. |
| Silica | 1.5 | do. |
| 1,2-propylene glycol | 6.4 | do. |
| Aqueous latex (as example 1) | 30.0 | do. |
| Approximate granule volume concentration 46%. | | |

| | Composition Number | | | | | | | |
|---|---|---|---|---|---|---|---|---|
| | 1. | 2. | 3. | 4. | 5. | 6. | 7. | 8. |
| 85° gloss | 2 units | 1 unit | 1 unit | 1 unit | 1 unit | 2 units | 2 units | 13 units |
| Sheeriness | marked | slight | nil | nil | nil | nil | nil | slight |
| Gloss increase-dry polishing | slight | slight | slight | slight | slight | slight | slight | marked |
| Gloss increase-wet polishing | nil | nil | nil | nil | nil | nil | film eroded | marked |
| Film integrity | excellent | excellent | excellent | excellent | excellent | fair | poor | good |

The results show that all of the compositions according to the invention provided satisfactory matte coating films. A slight incidence of sheeriness in composition No. 2 and of lower film integrity in composition No. 6 was assessed as being of minor significance compared with the relatively poor overall properties of compositions Nos. 1, 7 and 8 and was entirely absent from the The preparation of the coating followed the method given in example 1.

A film of the composition was applied by brush to a glass panel at a spreading rate of approximately 600 sq. ft. per gallon and allowed to dry in air at 25°C and 50 percent relative humidity. The film was of uneven, non-uniform appearance, with the larger particles causing visible "seediness;" showing a disadvantage of using granules which exceed the particle-size limits of the invention.

Example 4

Preparation of a range of coating compositions comprising spheroidal granules of poly(methyl methacrylate) pigmented with titanium dioxide. Compositions 1, 2, 7 and 12 lie outside of the composition ranges of the invention.

By the general method of example 1, latex paints having the compositions shown in table 3 were prepared. The pigmented granules were essentially of less than 50 micron Stokes diameter and had an elongation at break of less than 10 percent.

The weight average mean Stokes diameters of the pigmented granules of compositions 1, 2 and 12, when related to the granule volume concentration of the respective compositions, lie outside of the specified limits. The granule volume concentration of composition 7 is below the specified limit.

A comparative evaluation of the coating is described in example 5.

The results show the good overall appearance and low gloss of compositions according to the invention.

Compositions Nos. 1 and 2 showed severe increases in gloss on dry rubbed areas; they had poor mar resistance. The general appearance of composition No. 7 was unsatisfactory due to sheeriness, especially in area where succeeding coats had overlapped during application. Composition No. 12 was rejected as unsatisfactory because of the seediness of the film and the severe 'flip' which it exhibited.

The above evaluation was repeated on a further range of coating compositions based on the compositions of example 4. The new formulations were identical in all respects to those of example 4, except that the aqueous latex of example 4 was replaced by an equal weight (solids basis) of a vinyl acetate copolymer latex of 55 percent total solids. The relative performance of coating films formed therefrom was analogous to the above results.

Table 4

| | Composition Number | | | | | | | | | | | |
|---|---|---|---|---|---|---|---|---|---|---|---|---|
| | 1. | 2. | 3. | 4. | 5. | 6. | 7. | 8. | 9. | 10. | 11. | 12. |
| 85° Gloss | 2.2 | 2.5 | 1.9 | 1.8 | 1.5 | 1.5 | 0.7 | 0.6 | 0.5 | 0.5 | 0.5 | 0.5 |
| Sheeriness | Slight | Very Slight | Slight | Nil | Slight | Nil | Severe | Slight | Slight | Nil | Nil | Slight |
| Gloss increase — dry polishing | Severe | Severe | Moderate | Moderate | Moderate | Slight | Slight | Slight | Slight | Nil | Nil | Nil |
| Gloss increase — wet polishing | Moderate | Moderate | Moderate | Moderate | Slight | Slight | Nil | Nil | Nil | Nil | Nil | Nil |
| Film integrity | Excellent | Fair | Excellent | Fair | Excellent | Excellent | Excellent | Excellent | Excellent | Good | Fair | Excellent |
| General Appearance | Good | Good | Good | Good | Good | Good | Slight Seed | Slight Seed | Moderate seed | Moderate seed | Moderate seed | Seedy & pronounced 'flip' |

Example 6

Preparation of coating compositions according to the invention based on a range of pigmented polymer granules of varying pigmentation and polymer types and at a constant granule volume concentration of 65 percent. All of the granules were of mean Stokes diameter essentially less than 50 micron and percent elongation at break of less than 40 percent.

The composition of the granules is given in table 5.

Table 3

| | Composition Parts by Weight | | | | | | | | | | | |
|---|---|---|---|---|---|---|---|---|---|---|---|---|
| | No.1 | No.2 | No.3 | No.4 | No.5 | No.6 | No.7 | No.8 | No.9 | No.10 | No.11 | No.12 |
| Spheroidal granules (slurry) | 59 | 85.2 | 59 | 85.2 | 49.0 | 79.3 | 53.5 | 63.7 | 76.2 | 84.6 | 92.4 | 48.4 |
| Titanium dioxide | 14.2 | 5.1 | 14.2 | 5.1 | 17.6 | 7.1 | 16.1 | 12.5 | 3.2 | 5.3 | 2.6 | 18.8 |
| Sodium hexametaphosphate | 0.1 | 0.1 | 0.1 | 0.1 | 0.1 | 0.1 | 0.1 | 0.1 | 0.1 | 0.1 | 0.1 | 0.1 |
| Silica | 1.2 | 0.4 | 1.2 | 0.4 | 1.5 | 0.6 | 1.3 | 1.0 | 0.7 | 0.4 | 0.2 | 1.4 |
| 1,2-propylene glycol | 4.7 | 1.7 | 4.7 | 1.7 | 5.9 | 2.4 | 5.4 | 4.2 | 2.7 | 1.8 | 0.9 | 5.5 |
| Aqueous latex (as example 1) | 20.8 | 7.5 | 20.8 | 7.5 | 25.9 | 10.5 | 23.6 | 18.5 | 12.1 | 7.8 | 3.8 | 25.8 |
| Approximate G.V. Conc. | 49 | 79 | 49 | 79 | 48 | 80 | 39 | 49 | 64 | 75 | 87 | 52 |
| % pigment in granules (wt.) | 60 | 60 | 60 | 60 | 60 | 60 | 60 | 60 | 60 | 60 | 60 | 10 |
| % granules in slurry (wt.) | 40 | 40 | 40 | 40 | 60 | 60 | 33 | 33 | 33 | 33 | 33 | 45 |
| W.M.D. granules in micron | 4.7 | 4.7 | 6.0 | 6.0 | 11.6 | 11.6 | 25 | 25 | 25 | 25 | 25 | 38 |

Example 5

Comparative evaluation of the properties of films formed from the compositions of example 4. The method of testing is as described in example 2 and the results are set out in table 4.

By the general method of example 1, coating compositions were prepared to the following formula and adjusted to a satisfactory brushing viscosity as required by the addition of a water-soluble cellulosic thickener, according to conventional latex paint formulating practice:

| Pigmented polymer granules (slurry) | Amount adjusted to give a G.V. Conc. of 65%. | |
|---|---|---|
| Pigment | 12.9 | parts |
| Sodium hexametaphosphate | 0.1 | do. |
| Silica | 1.0 | do. |
| 1,2-propylene glycol | 3.7 | do. |
| Aqueous latex (as example 1) | 18.4 | do. |

All of the granules had an elongation at break of less than 40 percent. The compositions were evaluated for film properties as described in example 7.

TABLE 5

| Composition Number | Polymer | Pigment | Weight Pigment | W.M.D. in Micron |
|---|---|---|---|---|
| 1. | poly(vinyl chloride/vinyl acetate) (86/14 by weight) | titanium dioxide | 30% | 20 |
| 2. | poly(methyl methacrylate) | lamp black | 6% | 15 |
| 3. | poly(methyl methacrylate) | titanium dioxide/ china clay (67/33 by weight) | 57% | 13 |
| 4. | poly(methyl methacrylate) | titanium dioxide/ synth. aluminium Silicate (60/40 by weight) | 45% | 13 |
| 5. | poly(methyl methacrylate/ ethylene glycol dimeth- acrylate) (96/4 by weight) | titanium dioxide | 39% | 13 |
| 6. | poly(vinyl acetate) | titanium dioxide | 60% | 13 |
| 7. | poly(styrene/divinyl ben- zene) (96/4 by weight) | titanium dioxide | 60% | 13 |

Example 7

Comparison of a coating composition comprising pigmented polymer granules having an elongation at break of over 40 percent with compositions according to the invention.

A coating composition was prepared according to the method and formula of example 6 and in which the pigmented polymer granules, which were essentially all of less than 50 micron Stokes diameter, had the following properties:

| polymer type | butyl methacrylate/ methyl methacrylate/ divinyl benzene (84/14/2 by weight) |
|---|---|
| pigment | titanium dioxide |
| weight of pigment | 2% |
| W.M.D. | 15 micron |
| elongation at break | greater than 80% |

The composition was tested and compared with the coating compositions of example 6 by the method of example 2. All of the compositions gave matte films of uniform appearance. As a practical assessment of their relative resistance to marring, the films were exposed to a normal suburban atmosphere for a month and an attempt made to remove accumulated dirt by rubbing the panels with wet and dry cloths. The dirt was satisfactorily removed from the compositions of example 6, the rubbed areas exhibiting no significant degree of marring by gloss increase. The superior performance of the compositions according to the invention was evident when it was seen that embedded dirt could not be removed from the panel coated with the composition of example 7 without severely eroding and marring the surface of the coating.

Example 8

Coating compositions according to the invention are prepared incorporating pigmented granules of ureaformaldehyde and epoxy/polyamide condensate resins.

Granules of pigmented polymer were prepared by the mechanical grinding and classification of a ureaformaldehyde moulding resin pigmented with 60 percent by weight of titanium dioxide. The classified granules were of a generally spheroidal shape although more angular and irregular than the under-mentioned epoxy/ polyamide granules. The granules were classified to a product essentially below 50 micron Stokes diameter and the weight average mean Stokes diameter was found to be approximately 20 micron.

Granules of pigmented epoxy/polyamide polymer were made by the co-reaction in dilute aqueous suspension of equal parts by weight a commercial epoxy resin pigmented with titanium dioxide and a commercial polyamide resin. The epoxy resin was an epichlorhydrin/bis phenol A condensate with an epoxide equivalent of 450–530 and the polyamide was a commercial liquid grade of resin with an amine equivalent of 300–320. The pigment content of the granules was 22 percent by weight, their maximum Stokes diameter 30 micron and weight average mean Stokes diameter approximately 10 micron. The granules were of spheroidal shape.

The elongation at break of each pigmented polymer was less than 10 percent.

Coating compositions were prepared from each of the above types of granules to the formulation and by the method of example 6. Both compositions when tested by the method of example 2 provided matte films of good overall appearance and mar resistance. The granules comprising pigmented urea-formaldehyde resin produced films with an acceptable but slightly lower freedom from sheeriness or surface irregularities than the preferred spheroidal granules of pigmented epoxy/ polyamide resin.

Example 9

Preparation of coating compositions comprising pigmented polymer granules in which the compositions, excluding the granules, are above their critical pigment volume concentration.

The polymer granules used in the composition as a 48 percent by weight aqueous slurry had the following characteristics:

| Polymer composition | poly(methyl methacrylate/ tetra-allyloxy ethane) (98/2 by weight) |
|---|---|
| titanium dioxide | 40% by weight |
| maximum Stokes diameter | essentially 50 micron |
| W.M.D. | 15 micron |

By the general method of example 6, two coating compositions were prepared to the following formulae:

|  | A. |  | B. |  |
|---|---|---|---|---|
| Granules (slurry) | 56.4 | parts | 50.7 | parts |
| Titanium dioxide | 21.7 | do. | 15.2 | do. |
| Sodium hexametaphosphate | 0.1 | do. | 0.1 | do. |
| China clay | 4.8 | do. | — |  |
| Ammonia (S.G. 0.880) | 0.2 | do. | 0.2 | do. |
| Aqueous latex (as example 1) | 12.0 | do. | 6.8 | do. |
| Water | 4.8 | do. | 27.0 | do. |
| Granule volume concentration | 58% |  | 70% |  |
| Pigment Volume Concentration (omitting the granules) | 60% |  | 59% |  |

Both coating compositions when tested by the general method of example 2 gave coating films with an 80° gloss of less than 2 units and of uniform appearance. The films were of very high opacity and sheer-free. Although lower in mar resistance and film integrity than similar films in which the compositions (omitting the granules) were below their critical pigment volume concentration the films had acceptable mar resistance and were satisfactory for applications where freedom from sheeriness and uniform matte appearance are of more importance than high resistance to mechanical abrasion, e.g., for the painting of ceilings.

We claim:

1. An aqueous latex coating composition consisting essentially of a pigment and a synthetic film-forming addition polymer of at least one $\alpha$-$\beta$-ethylenically unsaturated monomer dispersed in an aqueous medium, at least a portion of said pigment being present in insoluble granules of pigmented synthetic polymer, the pigment being embedded in and surrounded by the synthetic polymer, said granules of pigmented synthetic polymer being dispersed in said aqueous latex in an amount of 45 to 90 percent by volume based on the total solids content of said coating composition, and further characterized in that the said granules of pigmented synthetic polymer:

a. consist essentially of synthetic polymer and from 1–75 percent by weight of pigment particles and are essentially of from 1–50 micron Stokes diameter with a weight average mean Stokes diameter related to their volume concentration in the total solids of the coating composition according to the following table:

| Volume Concentration of granules | | Weight Average Mean Stokes Diameter in Micron |
|---|---|---|
|  | 45 – 50% | 5 – 35 |
| Over | 50 – 60% | 5 – 35 |
| do. | 60 – 70% | 5 – 30 |
| do. | 70 – 80% | 5 – 30 |
| do. | 80 – 90% | 5 – 28 |

2. The coating composition according to claim 1 in which the weight average mean Stokes diameter of the granules of pigmented synthetic polymer is related to their volume concentration in the total solids of the coating according to the following table:

| Volume Concentration of Granules | | Weight Average Mean Stokes Diameter in Micron |
|---|---|---|
|  | 45 – 50% | 5 – 30 |
| Over | 50 – 60% | 5 – 28 |
| do | 60 – 70% | 5 – 25 |
| do. | 70 – 80% | 5 – 22 |
| do. | 80 – 90% | 5 – 20 |

3. The coating composition according to claim 1 in which the weight average mean Stokes diameter of the granules of pigmented synthetic polymer is related to their volume concentration in the total solids of the coating according to the following table:

| Volume Concentration of Granules | | Weight Average Mean Stokes Diameter in Micron |
|---|---|---|
|  | 45 – 50% | 10 – 25 |
| Over | 50 – 60% | 10 – 23 |
| do. | 60 – 70% | 10 – 20 |
| do. | 70 – 80% | 10 – 20 |
| do. | 80 – 90% | 10 – 20 |

4. The coating composition according to claim 1 in which the granules are spheroidal.

5. The coating composition according to claim 1 in which the pigment particles are essentially of less than 1 micron diameter.

6. The coating composition according to claim 1 in which the volume concentration of granules is 55–75 percent of the total solids content of the composition.

7. The coating composition according to claim 1 in which the pigment is titanium dioxide and the amount of titanium dioxide in said granules is at least 45 percent by weight.

* * * * *